United States Patent
Kim et al.

(10) Patent No.: US 10,540,137 B2
(45) Date of Patent: Jan. 21, 2020

(54) METHOD FOR REPRODUCING MUSIC PATTERNS AND ELECTRONIC DEVICE THEREOF

(71) Applicant: Samsung Electronics Co., Ltd., Gyeonggi-do (KR)

(72) Inventors: Hangyul Kim, Seoul (KR); Taemin Cho, Gyeonggi-do (KR); Sungmin Kim, Seoul (KR); Min-Hee Lee, Seoul (KR); Yunjae Lee, Seoul (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 376 days.

(21) Appl. No.: 15/230,570

(22) Filed: Aug. 8, 2016

(65) Prior Publication Data
US 2017/0046116 A1 Feb. 16, 2017

(30) Foreign Application Priority Data

Aug. 10, 2015 (KR) ........................ 10-2015-0112602

(51) Int. Cl.
*G06F 3/16* (2006.01)
*G06F 3/0481* (2013.01)
*G06F 3/0488* (2013.01)

(52) U.S. Cl.
CPC .......... *G06F 3/162* (2013.01); *G06F 3/04817* (2013.01); *G06F 3/04883* (2013.01); *G06F 3/165* (2013.01)

(58) Field of Classification Search
CPC ...... G06F 3/162; G06F 3/165; G06F 3/04842; G06F 3/04817; G06F 3/04883; G06F 3/0482
See application file for complete search history.

(56) References Cited

U.S. PATENT DOCUMENTS

| | | | | |
|---|---|---|---|---|
| 7,019,205 B1* | 3/2006 | Fujisawa | .................. | A63F 13/10 84/609 |
| 7,441,193 B1* | 10/2008 | Wild | ...................... | G06F 3/0213 345/173 |
| 9,076,264 B1* | 7/2015 | Gillespie | ............... | G06T 11/206 |
| 2003/0086686 A1* | 5/2003 | Matsui | ................. | G11B 27/034 386/281 |

(Continued)

FOREIGN PATENT DOCUMENTS

| JP | 2010-66660 A | 3/2010 |
|---|---|---|
| JP | 2012-194525 A | 10/2012 |

OTHER PUBLICATIONS

Novation Launchpad iPad App Review. Blog post dated Jul. 1, 2013. Retrieved from [https://crossfadr.com/2013/07/01/novation-launchpad-ipad-app/] on [Aug. 29, 2018]. 6 pages. (Year: 2013).*

(Continued)

*Primary Examiner* — Amy M Levy
(74) *Attorney, Agent, or Firm* — Cha & Reiter, LLC.

(57) ABSTRACT

A method for use in an electronic device, comprising: displaying a looper screen including a plurality of loop items; displaying, on the looper screen, a first shortcut item that is associated with one or more of the loop items; and reproducing a first music pattern associated with one or more loop items in response to a first selection of the first shortcut item.

16 Claims, 13 Drawing Sheets

(56) References Cited

U.S. PATENT DOCUMENTS

| | | | |
|---|---|---|---|
| 2005/0024488 A1* | 2/2005 | Borg | G06Q 30/06 |
| | | | 348/36 |
| 2006/0022956 A1* | 2/2006 | Lengeling | G06F 3/04847 |
| | | | 345/173 |
| 2008/0030462 A1* | 2/2008 | Lasar | G06Q 10/10 |
| | | | 345/156 |
| 2008/0306619 A1* | 12/2008 | Cerra | G11B 27/10 |
| | | | 700/94 |
| 2009/0107320 A1* | 4/2009 | Willacy | G10H 1/46 |
| | | | 84/609 |
| 2009/0304207 A1* | 12/2009 | Cooper | H04H 60/04 |
| | | | 381/119 |
| 2010/0064881 A1 | 3/2010 | Takehisa | |
| 2011/0069011 A1* | 3/2011 | Fujita | H04H 60/04 |
| | | | 345/172 |
| 2012/0222540 A1 | 9/2012 | Usui et al. | |
| 2013/0139057 A1* | 5/2013 | Vlassopulos | G10H 1/0058 |
| | | | 715/716 |
| 2013/0239787 A1 | 9/2013 | McMillen et al. | |
| 2014/0270181 A1* | 9/2014 | Siciliano | G11B 27/038 |
| | | | 381/17 |
| 2014/0281984 A1* | 9/2014 | Milne | G06F 17/30778 |
| | | | 715/716 |
| 2015/0052464 A1* | 2/2015 | Chen | G06F 3/04817 |
| | | | 715/765 |
| 2015/0268921 A1* | 9/2015 | Georges | G05B 15/02 |
| | | | 700/94 |

OTHER PUBLICATIONS

Settle, Mark. In-app effects come to Launchpad for iPad. Blog post at DJWorx. Published Mar. 10, 2015. Retrieved from [https://djworx.com/in-app-effects-come-to-launchpad-for-ipad/] on [Aug. 29, 2018]. 9 pages (Year: 2015).*

Synth Universe YouTube video published on Mar. 11, 2013 including screenshots taken at 0:24, 1:03, 2:22, and 2:56; retrieved from [https://www.youtube.com/watch?v=z-dF-FYVPQA] on [Dec. 26, 2018] (Year: 2013).*

Novation Launchpad—Sampler App for Making Exciting Music: iOS, App/software, Jul. 23, 2014, pp. 1-7 http://leeminsu.com/220069231845.

* cited by examiner

METHOD FOR REPRODUCING MUSIC PATTERNS AND ELECTRONIC DEVICE THEREOF

CLAIM OF PRIORITY

This application claims the priority under 35 U.S.C. § 119(a) to Korean Application Serial No. 10-2015-0112602, which was filed in the Korean Intellectual Property Office on Aug. 10, 2015, the entire content of which is hereby incorporated by reference.

TECHNICAL FIELD

The present disclosure relates to an electronic device and operation method thereof.

BACKGROUND

In general, an electronic device performs complex functions to which various functions are added. For example, the electronic device may perform a mobile communication function, data communication function, image photographing function, audio recording function, and audio reproduction function. The electronic device is provided with a display unit and an input unit. At this time, the display unit and the input unit are combined so as to be implemented to a touch screen. In addition, the electronic device may output a display screen through the display unit. In addition, the electronic device may detect a touch on the display screen so as to control the display screen.

However, the electronic device may not provide various interactions with respect to various touch operations. Therefore, the electronic device has difficulty in controlling the display screen corresponding to various touch operations. Accordingly, the use efficiency of the electronic device and a user convenience become low.

SUMMARY

According to aspects of the disclosure, a method for use in an electronic device is provided, comprising: displaying a looper screen including a plurality of loop items; displaying, on the looper screen, a first shortcut item that is associated with one or more of the loop items; and reproducing a first music pattern associated with one or more loop items in response to a first selection of the first shortcut item.

According to aspects of the disclosure, an electronic device is provided comprising: a display unit; an audio processor; a memory; at least one processor operatively coupled to the memory, configured to: display, on the display unit, a looper screen including a plurality of loop items; display, on the looper screen, a first shortcut item that is associated with one or more of the loop items; and reproduce, via the audio processor, a first music pattern associated with one or more loop items in response to a first selection of the first shortcut item.

BRIEF DESCRIPTION OF THE DRAWINGS

The above and other aspects, features, and advantages of the present disclosure will be more apparent from the following detailed description taken in conjunction with the accompanying drawings, in which.

DETAILED DESCRIPTION

Figure 1:
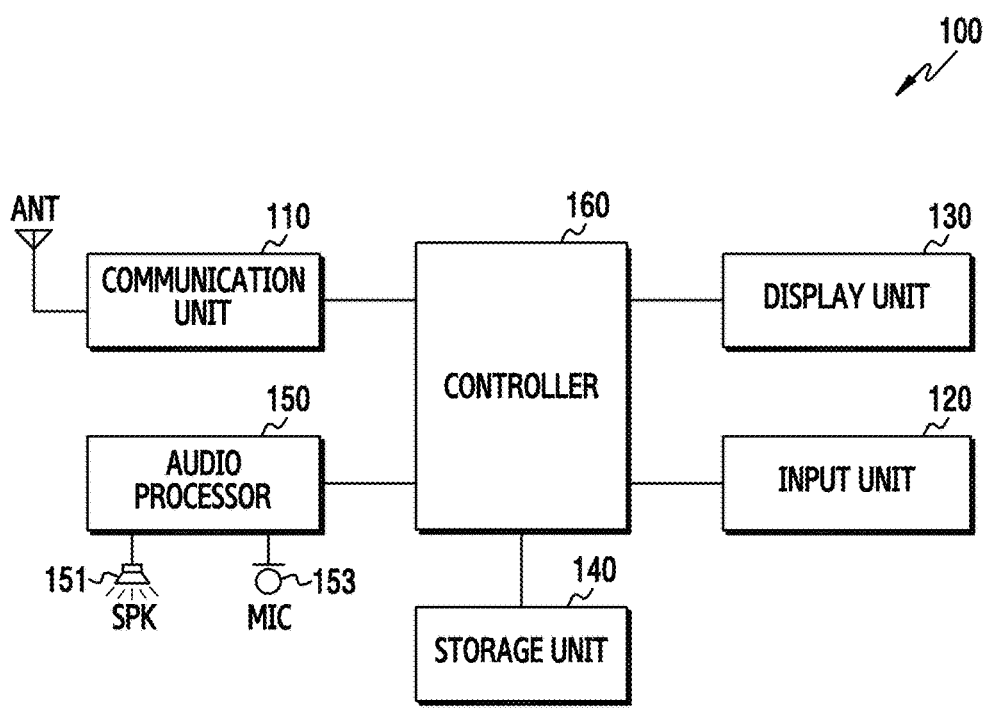
FIG. 1 is a block diagram of an example of an electronic device, according to various embodiments of the present disclosure.

Hereinafter, the embodiments of the present disclosure will be described in detail with reference to the accompanying drawings. Here, it is noted that identical reference numerals denote the same structural elements in the accompanying drawings. The detailed description of known functions and structures will be omitted to avoid an unclearness of the subject matter of the present disclosure.

In the following description, the term "a looper function" denotes virtual instruments available on the electronic device. That is, the electronic device may execute the looper function so as to reproduce various music patterns. Here, the music patterns may have different attributes. For example, the attributes may be determined according to at least one of a genre, a musical instrument, or a mood. Furthermore, the electronic device may execute the looper function so as to apply various audio effects to music patterns. Here, each of the audio effects may be determined by a combination of setting values corresponding to a plurality of audio parameters. That is, according to the change of the setting values corresponding to at least one of the audio parameters, the audio effects may be different from each other. Accordingly, the user of the electronic device may play music, through the looper function, by combining the music patterns. On the other hand, the user of the electronic device may compose music, through the looper function, by combining the music patterns.

FIG. 1 is a block diagram of an example of an electronic device 100, according to various embodiments of the present disclosure. As illustrated, the electronic device 100 may include a communication unit 110, an input unit 120, a display unit 130, a storage unit 140, an audio processor 150, and a controller 160.

The communication unit 110 may perform communication in the electronic device 100. At this time, the communication unit 110 may communicate with an external device (not illustrated) in various communication schemes. Herein, the communication unit 110 may perform at least one of wireless communication and wired communication. To this end, the communication unit 110 may access at least one of a mobile communication network and a data communication network. Otherwise, the communication unit 110 may perform short-range communication. The communication unit 110 may include at least one antenna. For example, the external device may include an electronic device, a base station, a server, and a satellite. In addition, the communication schemes may include Long Term Evolution (LTE), Wideband Code Division Multiple Access (WCDMA), Global System for Mobile Communications (GSM), Wi-Fi, Bluetooth, and Near Field Communications (NFC).

The input unit 120 may generate input data in the electronic device 100. At this time, the input unit 120 may generate the input data corresponding to a user input of the electronic device 100. Further, the input unit 120 may include at least one input means. The input unit 120 may include at least one of a keypad, a dome switch, a physical button, a touch panel, a jog & shuttle, and a sensor.

The display unit 130 may output display data from the electronic device 100. The display unit 130 may include a Liquid Crystal Display (LCD), a Light Emitting Diode (LED) display, an Organic LED (OLED) display, a Micro Electro Mechanical System (MEMS) display, and an electronic paper display. Here, the display unit 130 may be implemented as a touch screen while being coupled to the input unit 120.

The storage unit 140 may include any suitable type of volatile or non-volatile memory, such as Random-access Memory (RAM), Read-Only Memory (ROM), Network Accessible Storage (NAS), cloud storage, a Solid State Drive (SSD), etc. In operation, the storage unit 140 may store operation programs of the electronic device 100. Here, the storage unit 140 may store programs for executing looper functions. Further, the storage unit 140 may store data generated while the programs are being executed. In addition, the storage unit 140 may store various music patterns and various audio effects.

The audio processor 150 may process an audio signal. At this time, the audio processor 150 may include a speaker (SPK) 151 and a microphone (MIC) 153. That is, the audio processor 150 may output, through the speaker 151, an audio signal output from the controller 160. In addition, the audio processor 150 may transmit an audio signal generated from the microphone 153 to the controller 160.

The controller 160 may include a microprocessor or any suitable type of processing circuitry, such as one or more general-purpose processors (e.g., ARM-based processors), a Digital Signal Processor (DSP), a Programmable Logic Device (PLD), an Application-Specific Integrated Circuit (ASIC), a Field-Programmable Gate Array (FPGA), a Graphical Processing Unit (GPU), a video card controller, etc. In operation, the controller 160 may control an overall operation of the electronic device 100. To this end, the controller 160 may control elements of the electronic device 100. Then, the controller 160 may receive and process a command or data from the elements of the electronic device 100. At this time, the controller 160 may execute the looper function.

Specifically, the controller 160 may display, on the display unit 130, a looper screen including a plurality of loop items. At this time, the music patterns may be individually assigned to the loop items. Accordingly, when at least one of the loop items is selected through the input unit 120, the controller 160 may reproduce at least one of the music patterns through the audio processor 150. Then, the controller 160 may apply various audio effects to the music patterns.

Then, the controller 160 may display at least one shortcut item on the looper screen of the display unit 130. Here, the controller 160 may map at least one of the loop items to a shortcut item and store an indication of the mapping. In addition, when the shortcut item is selected through the input unit 120, the controller 160 may reproduce at least music pattern that corresponds to at least one of the loop items. On the other hand, the controller 160 may map any one of the audio effects to a shortcut item and store them. Furthermore, when the shortcut item is selected through the input unit 120, the controller 160 may apply any one of the audio effects to at least one of music patterns.

Figure 2:
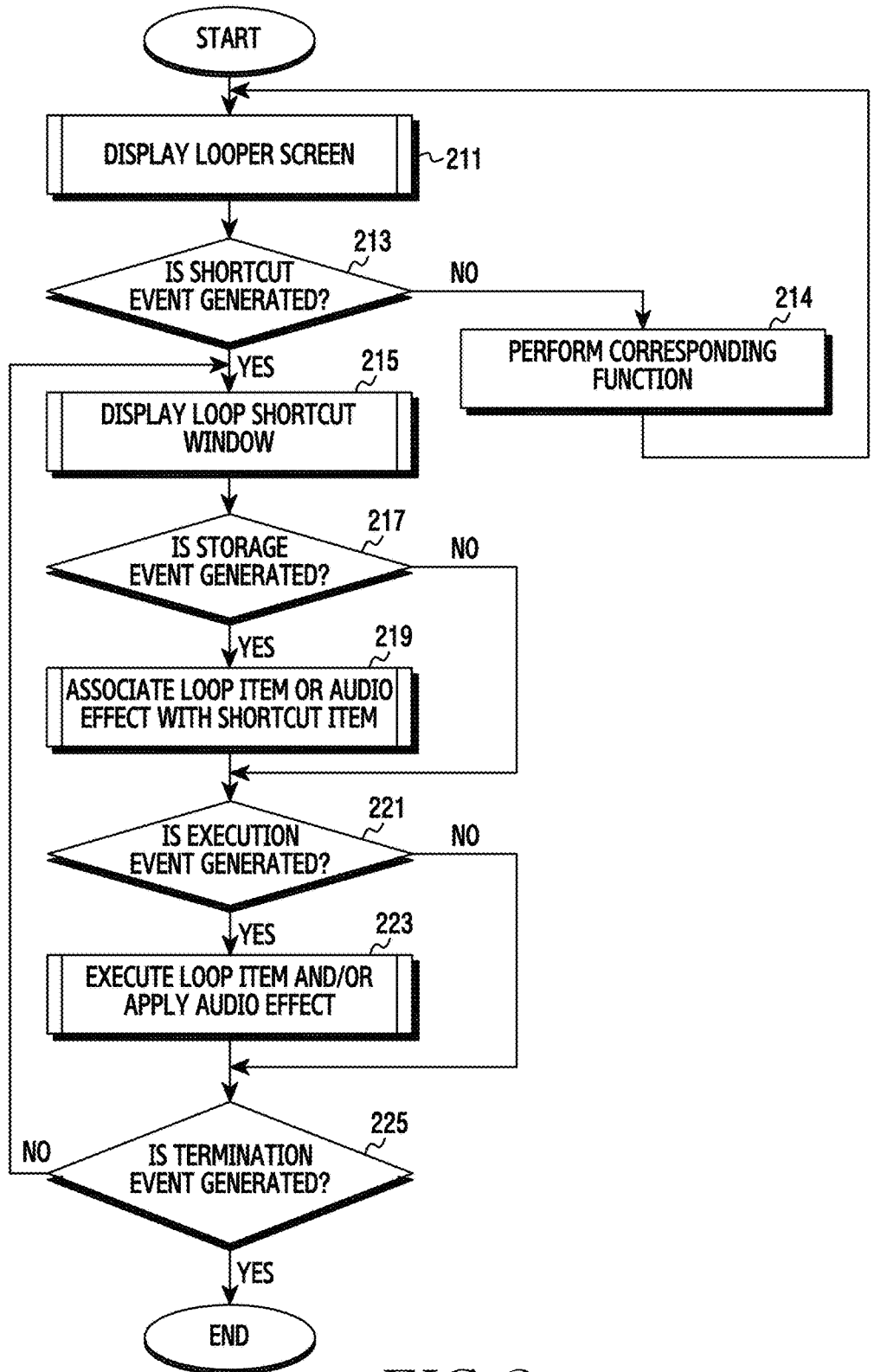
FIG. 2 is a flowchart of an example of a process, according to various embodiments of the present disclosure.

FIG. 2 is a flowchart of an example of a process, according to various embodiments of the present disclosure. In addition, FIGS. 7, 8, 9, 10, 11, 12 and 13 are diagrams of various user interfaces that may be displayed as a result of executing the process of FIG. 2.

Figure 7:
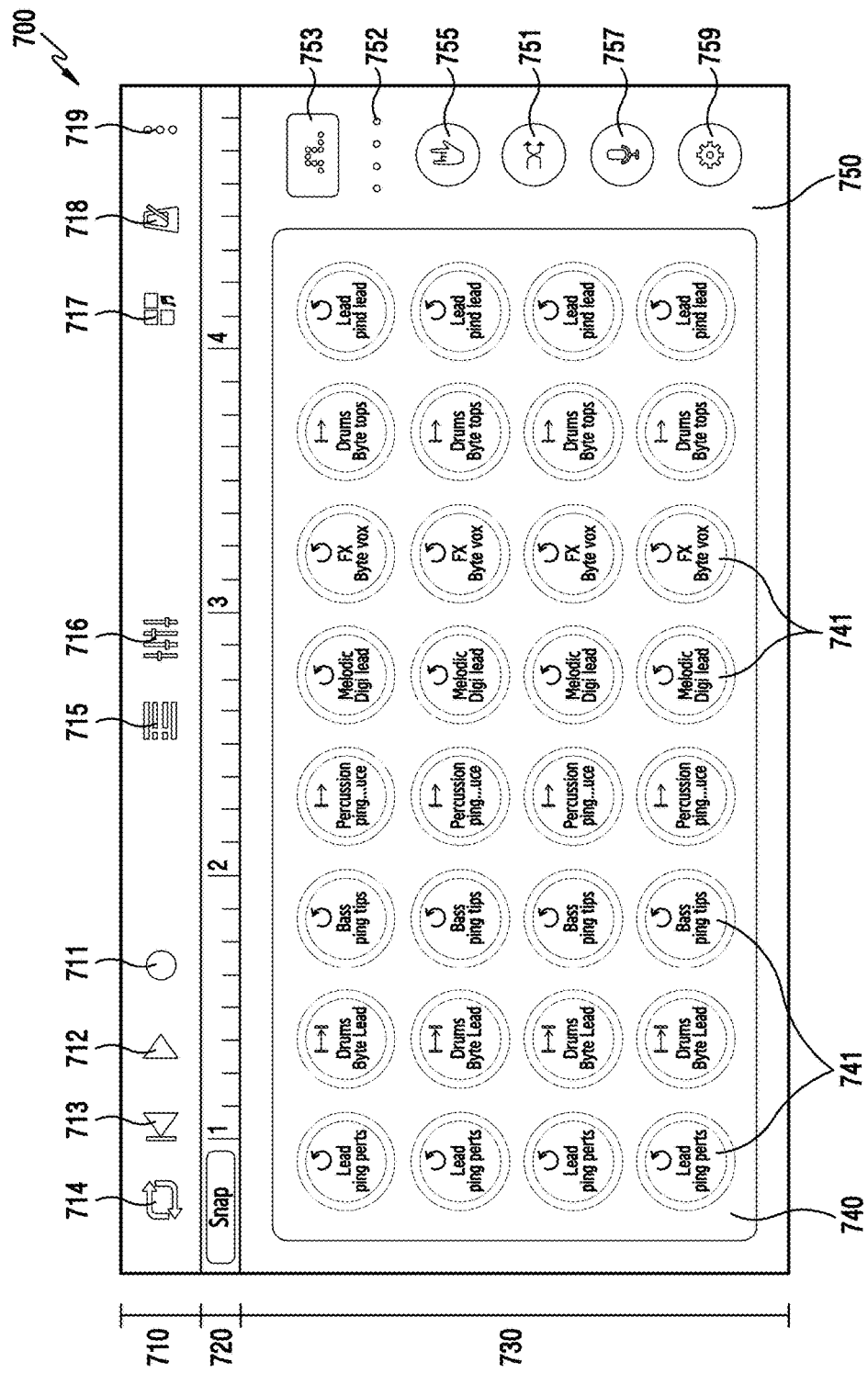
FIG. 7 is a diagram of an example of a user interface, according to various embodiments of the present disclosure.

In operation 211, the controller 160 may display a looper screen 700. For example, when a request for executing the looper function occurs, the controller 160 may select a genre selection screen (not shown) for selecting any one of a plurality of genres. Then, when any one of a plurality of genres is selected from the genre selection screen, the controller 160 may display the looper screen 700 that corresponds to any one of the plurality of genres. As illustrated in FIG. 7, the looper screen 700 may include a control region 710, a timeline region 720, and a looper execution region 730. However, in some implementations, the looper screen 700 may not include the control region 710 and timeline region 720.

The control region 710 may be provided for an overall control of the looper function. Here, the control region 710 may include a storage icon 711, a play icon 712, a change icon 713, an AB repeat icon 714, an edit icon 715, a special effect(s) icon 716, a genre icon 717, a beat indicator 718, and other icons 719. The storage icon 711 may be used to store music patterns in a music file. The play icon 712 may be used to play music files. The change icon 713 may be used to change the playback position in the music file. The AB repeat icon 714 may be used to repeat a predetermined section in the music file. The edit icon 715 may be used to edit the music file. The special effect(s) icon 716 may be used to apply special effects to the music file. The genre icon 717 may be used to change the genre corresponding to the genre of the music file or the genre corresponding to the looper execution region 730. The beat indicator 718 may be used to display the beat of the music file. The other icon 719 may be used for other control of the looper function. The timeline region 720 may be arranged to display the playback position in the music file.

The looper execution region 730 may be substantially provided for the execution of the looper function. For example, the looper execution region 730 may include a loop region 740 and an icon region 750.

The loop region 740 may include a plurality of loop items 741. In some implementations, each of the loop items 741 may be assigned a different one of the music patterns. The music patterns may have different attributes, such as a genre, a musical instrument, or a mood. In addition, the loop items 741 may be arranged in a grid. For example, the loop items 741 may be arranged in rows and columns. For example, music patterns of the same genre may be assigned to the loop items 741. In addition, music patterns of the same mood may be assigned to the loop items 741 in the same row, and music patterns of the same musical instrument may be assigned to the loop items 741 in the same column. In addition, the loop items 741 may have various forms. The loop items 741 may have a circular shape, a polygonal shape, and/or any other suitable type of shape.

The icon region 750 may include a combination icon 751, a beat indicator 752, an effect icon 753, a shortcut icon 755, a recording icon 757, and a setting icon 759. The combination icon 751 may be used to randomly select at least one of the loop items 741. The beat indicator 752 may be used to display at least one reproduction beat of the music patterns. The effect icon 753 may be used to apply an audio effect to at least one of the music patterns. The shortcut icon 755 may be used for shortcut setting or shortcut executing of at least one of the loop items 741 or at least one of the audio effects. The recording icon 757 may be used to register an audio signal received from the audio processor 150 to the music pattern, corresponding to any one of the loop items 741. The setting icon 759 may be used to change the individual settings of the loop items 741.

Figure 3:
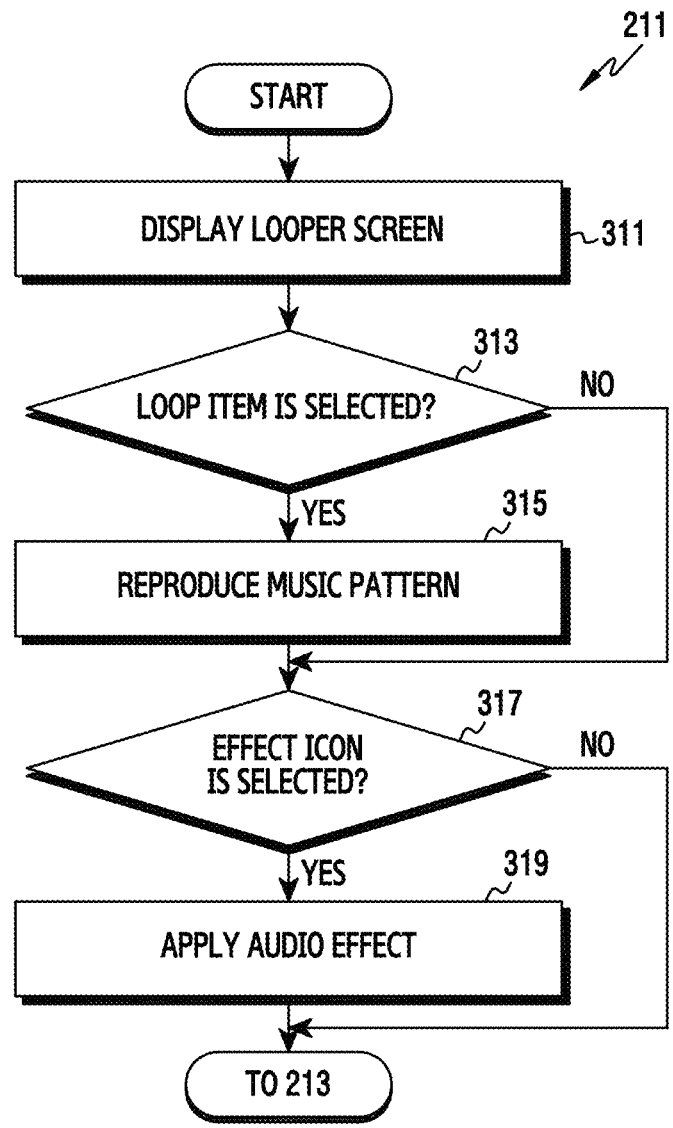
FIG. 3 is a flowchart of an example of a process associated with the process of FIG. 2, according to various embodiments of the present disclosure.

FIG. 3 is a flowchart of an example of a process for performing operation 211, according to various embodiments of the present disclosure. According to the process, the controller 160 may display a looper screen 700 in operation 311. For example, when a request for executing the looper function occurs, the controller 160 may select a genre selection screen (not shown) for selecting any one of a plurality of genres. Then, when any one of a plurality of genres is selected from the genre selection screen, the controller 160 may display the looper screen 700 that corresponds to any one of the plurality of genres. That is, the controller 160 may assign music patterns to the loop items 741 of the loop region 740 that correspond to any one of the genres.

For example, the controller 160 may display the looper screen 700 as shown in FIG. 7. The looper screen 700 may include a control region 710, a timeline region 720, and a looper execution region 730. More particularly, the looper execution region 730 may include a loop region 740 and an icon region 750. The loop region 740 may include a plurality of loop items 741. At this time, music patterns may be individually assigned to the loop items 741. In addition, the loop items 741 may be arranged in a grid. That is, the loop items 741 may be arranged in rows and columns. The icon region 750 may include a combination icon 751, a beat indicator 752, an effect icon 753, a shortcut icon 755, a recording icon 757, and a setting icon 759.

Next, when at least one of the loop items 741 is selected from the looper screen 700, the controller 160 may detect the selection in operation 313. For example, when a touch gesture is performed in the loop region 740, the controller 160 may select at least one of the loop items 741 based on the touch gesture. For example, when at least one touch occurs in the loop region 740, the controller 160 may select at least one of the loop items 741 according to the position of the touch. For example, when the movement of the touch occurs in the loop region 740, the controller 160 may select at least one of the loop items 741 according to the movement path of the one touch. On the other hand, when the combination icon 751 is selected from the item region 750, the controller 160 may arbitrarily select at least one of the loop items 741. For example, the controller 160 may select at least one item from each of the columns of the grid in which the loop items 741 are arranged.

Next, the controller 160 may reproduce at least any one of the music patterns in operation 315. That is, the controller 160 may reproduce at least one of the music patterns that corresponds to at least one of the selected loop items 741. For example, the controller 160 may reproduce the music pattern(s) only once. As another example, the controller 160 may repeatedly reproduce the music pattern(s). Additionally or alternatively, the controller 160 may continuously reproduce at least one of the music patterns while the selection of the loop items 741 is maintained (e.g., while a touch is maintained on one of the loop items 741). In some implementations, the controller 160 may display at least one reproduction beat of the music patterns through the beat indicator 752. For example, the controller 160 may flicker the beat indicator 752 to correspond to the at least one reproduction beat of the music patterns. Thereafter, the process may proceed to operation 317.

Figure 8:
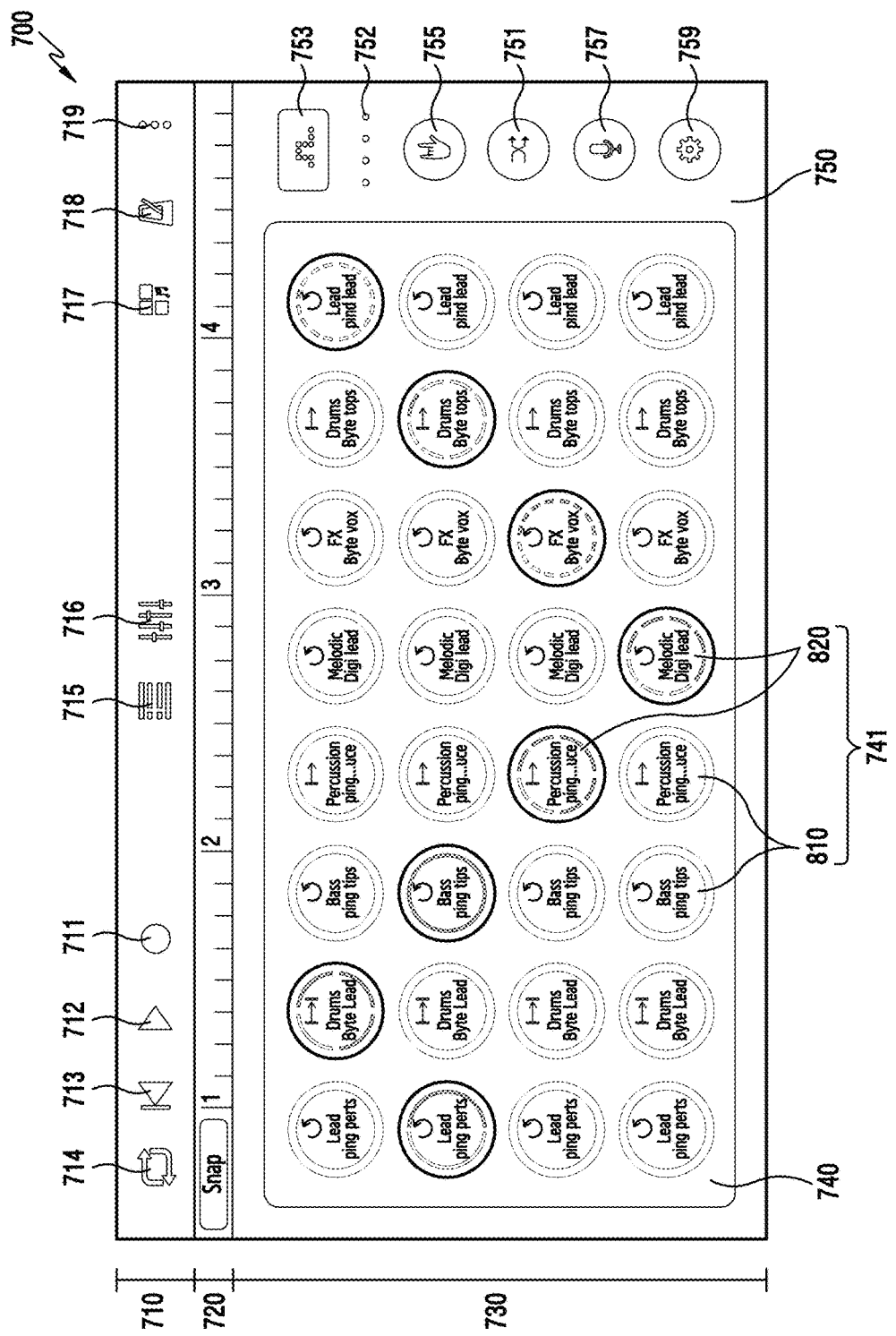
FIG. 8 is a diagram of an example of a user interface, according to various embodiments of the present disclosure.

According to aspects of the disclosure, when reproducing at least one of the music patterns, the controller 160 may activate at least one of the loop items 741 that corresponds to one or more of music patterns that are being reproduced, as shown in FIG. 8. Here, at least one of the loop items 741 may be converted from inactive items 810 into active items 820. Then, the controller 160 may display the active items 820 differently from the inactive items 810 (e.g., in a different color). For example, the controller 160 may highlight at least one of the active items 820 or display a marker on or around the active items 820 (e.g., dashed circle). In some implementations, the controller 160 may select the color(s) in which the active items are highlighted based on the respective positions of the active items 820 in the loop region 740. To this end, various colors may be individually assigned to the columns of the loop items 741 in the loop region 740.

On the other hand, in operation 313, when the loop items 741 of the looper screen 700 are not selected, the process may proceed to operation 317.

Next, when the effect icon 753 is selected from the looper screen 700, the controller 160 may detect the selection of the loop items in operation 317. Then, the controller 160 may apply any one of the audio effects in operation 319. For example, the controller 160 may apply any one of the audio effects to at least one of the music patterns. Each of the audio effects may be determined by a combination of the setting values corresponding to a plurality of audio parameters. That is, according to the change of the setting values corresponding to at least one of the audio parameters, the audio effects may be different from each other. In addition, the controller 160 may continuously reproduce at least one of the music patterns.

Figure 9:
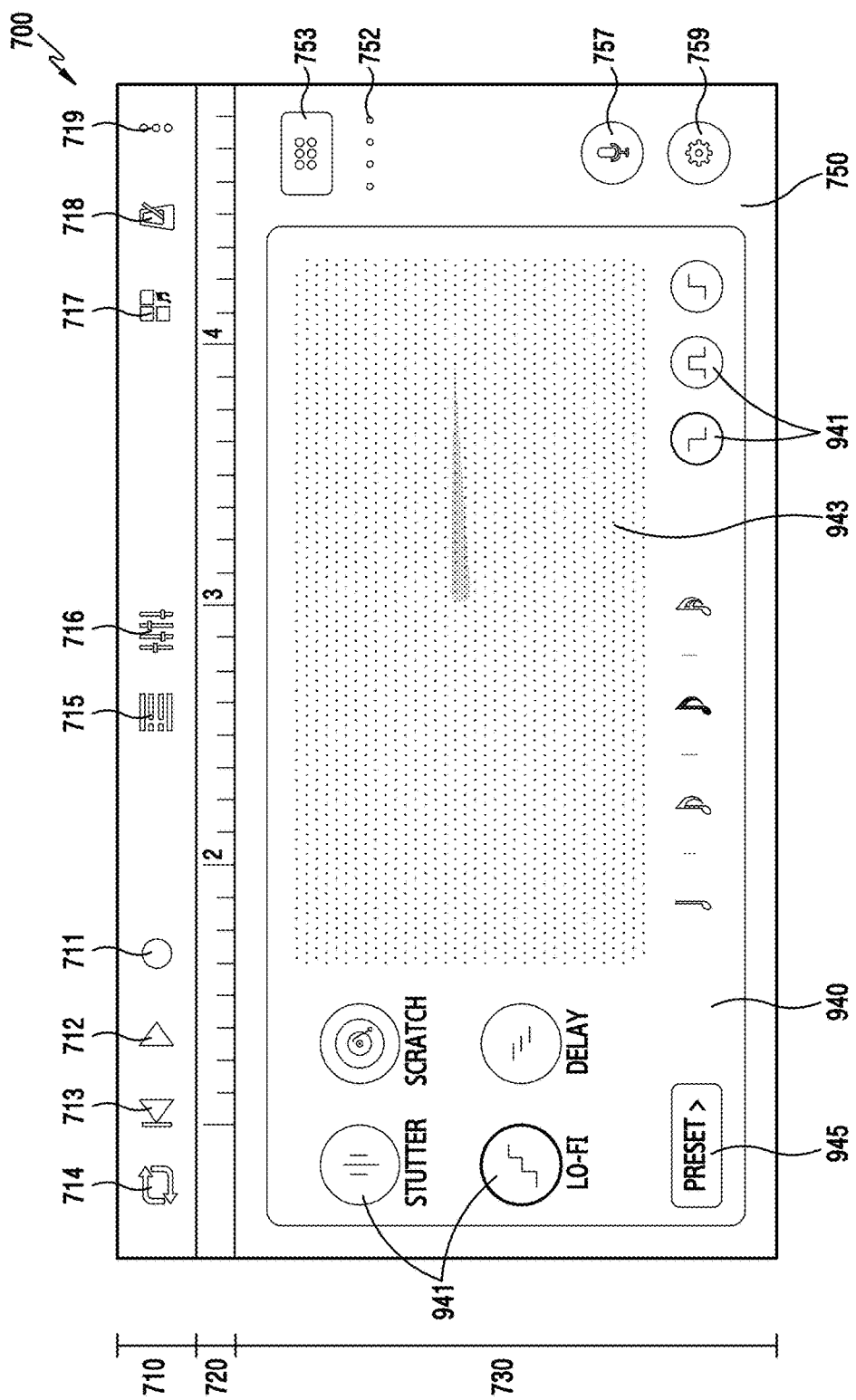
FIG. 9 is a diagram of an example of a user interface, according to various embodiments of the present disclosure.

When the effect icon 753 is selected, the controller 160 may display an effect adjustment window 940 on the looper screen 700 as shown in FIG. 9. More particularly, the controller 160 may display the effect adjustment window 940 on the looper execution region 730 in the looper screen 700. The effect adjustment window 940 may include a plurality of effect adjustment icons 941, an effect adjustment pad 943, and an effect selection icon 945.

The effect adjustment icons 941 and effect adjust pad 943 may be used to apply any one of the audio effects to at least one of the music patterns. In addition, audio parameters may be individually assigned to the effect adjustment icons 941. When any one of the effect adjustment icons 941 is selected, the controller 160 may adjust any one of audio parameters. For example, the controller 160 may adjust any one of the audio parameters according to at least one of the selected number of times of the effect adjustment icons 941 and the retention time of the selection. On the other hand, the audio parameters may be individually assigned on the horizontal axis and vertical axis of the effect adjustment pad 943. In addition, when the touch gesture occurs on the effect adjustment pad 943, the controller 160 may adjust at least one of audio parameters according to the touch gesture. Accordingly, the controller 160 may apply any one of the audio effects to at least one of the music patterns.

Figure 10:
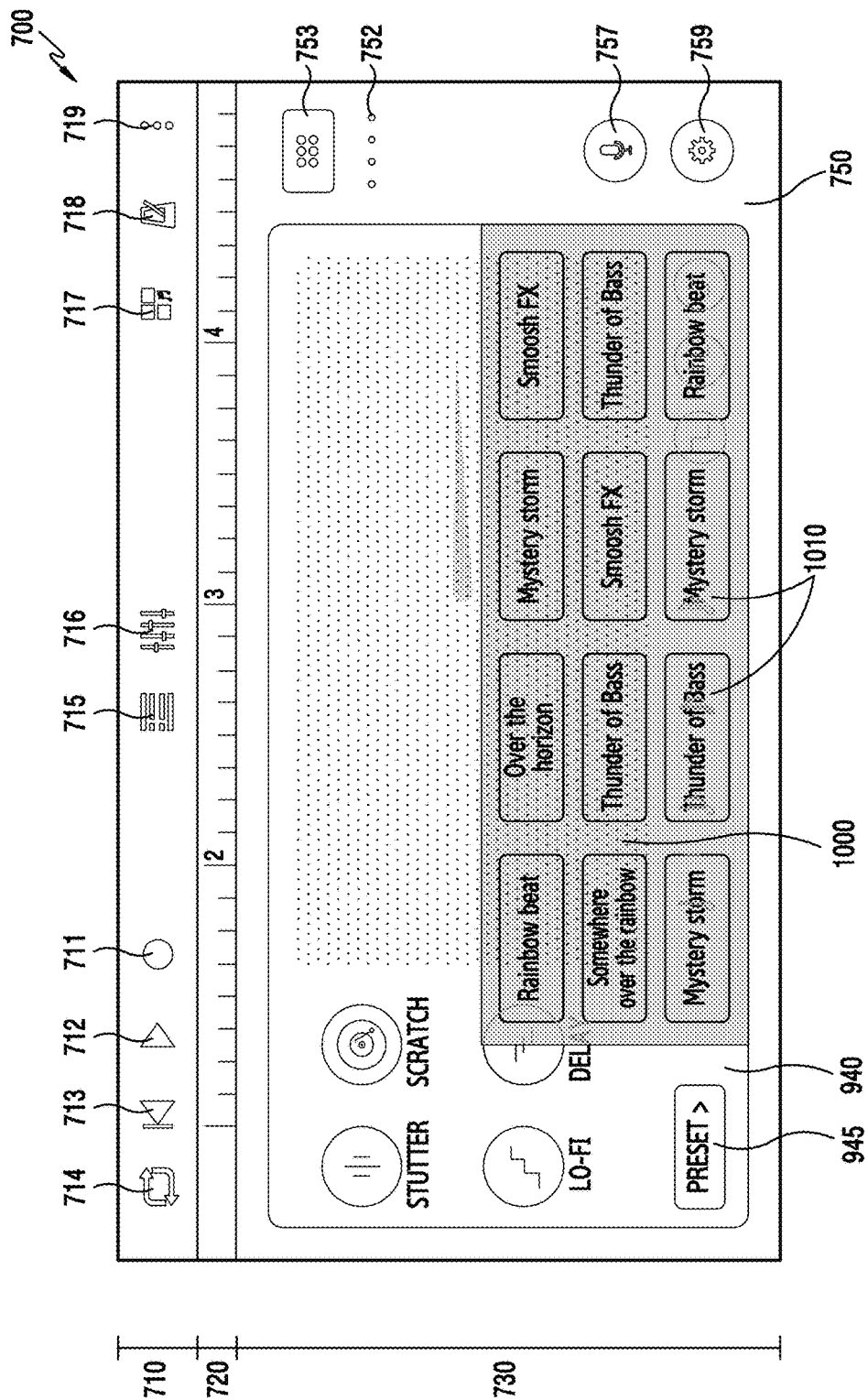
FIG. 10 is a diagram of an example of a user interface, according to various embodiments of the present disclosure.

The effect selection icon 945 may be used to invoke an effect selection window 1000. That is, when the effect selection icon 945 is selected from the effect adjustment window 940, the controller 160 may display the effect selection window 1000 as shown in FIG. 10. More particularly, the controller 160 may display the effect selection window 1000 on the effect adjustment window 940 in the looper screen 700. The effect selection window 1000 may include a plurality of effect items 1010. The effect items 1010 may be used to apply an audio effect to at least one of the music patterns. Here, audio effects may be individually assigned to the effect items 1010. That is, the audio effects may be preconfigured to the effect items 1010. In addition, when at least one of the effect items 1010 is selected from the effect selection window 1000, the controller 160 may apply any one of the audio effects to at least one of the music patterns. Thereafter, the process may proceed to operation 213.

On the other hand, in operation 317, when the effect icon 753 of the looper screen 700 is not selected, the process may proceed to operation 213.

In operation 213, the controller 160 may detect whether a shortcut event is generated. For example, the shortcut event may be generated when the shortcut icon 755 is selected from the looper screen 700. When the shortcut event is generated, the process may proceed to operation 215.

On the other hand, when the shortcut icon 755 is not selected in operation 213, the controller 160 may perform a corresponding function in operation 214. At this time, when the record icon 757 is selected from the looper screen 700 and any one of the loop items 741 is selected, the controller 160 may register the audio signal that is received from the audio processor 150 to a music pattern in response to any one of the loop items 741. On the other hand, when the setting icon 759 is selected from the looper screen 700 and any one of the loop items 741 is selected, the controller 160 may change the settings in response to any one of the loop items 741. On the other hand, when a genre icon 717 is selected from the looper screen 700, the controller 160 may change the genre corresponding to the looper execution region 730. Thereafter, the controller 160 may return to operation 211. In addition, the controller 160 may repeatedly perform at least one of operation 211 to operation 214.

Figure 11:
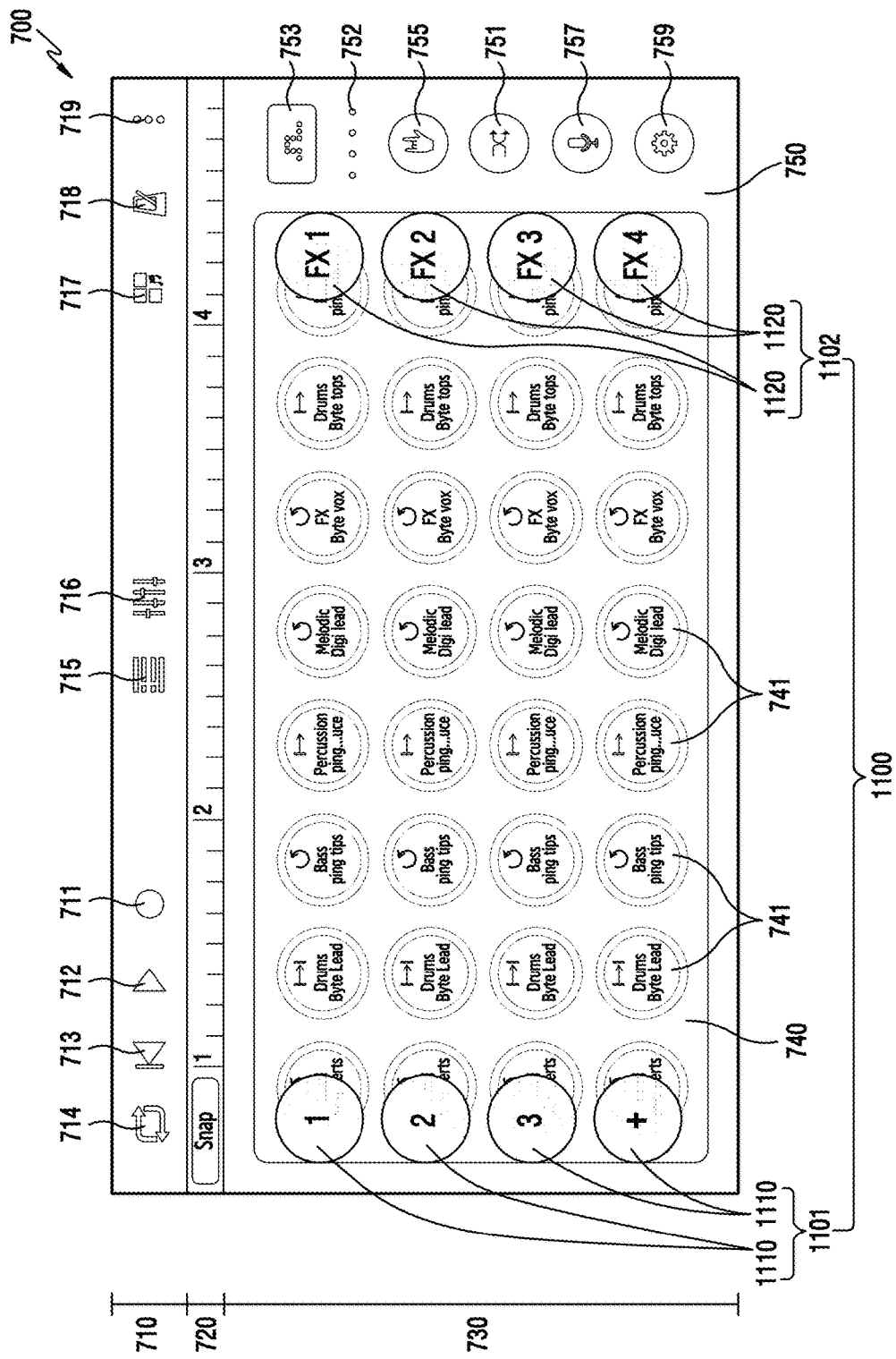
FIG. 11 is a diagram of an example of a user interface, according to various embodiments of the present disclosure.

In operation 215, the controller 160 may display a loop shortcut window 1100. For example, the controller 160 may display the loop shortcut window 1100 on the looper screen 700. More particularly, the controller 160 may display the loop shortcut window 1100 on the looper execution region 730. Furthermore, the controller 160 may display the loop shortcut screen 1100 on the looper screen 700 as shown in FIG. 11. Here, the loop shortcut window 1100 may expose the loop items 741. In addition, the loop shortcut window 1100 may include one or more shortcut items 1110 and 1120. For example, the shortcut items 1110 and 1120 may have a circular shape and a polygonal shape. Operation 215 will be described in further detail in the discussion with respect to FIG. 4.

Figure 4:
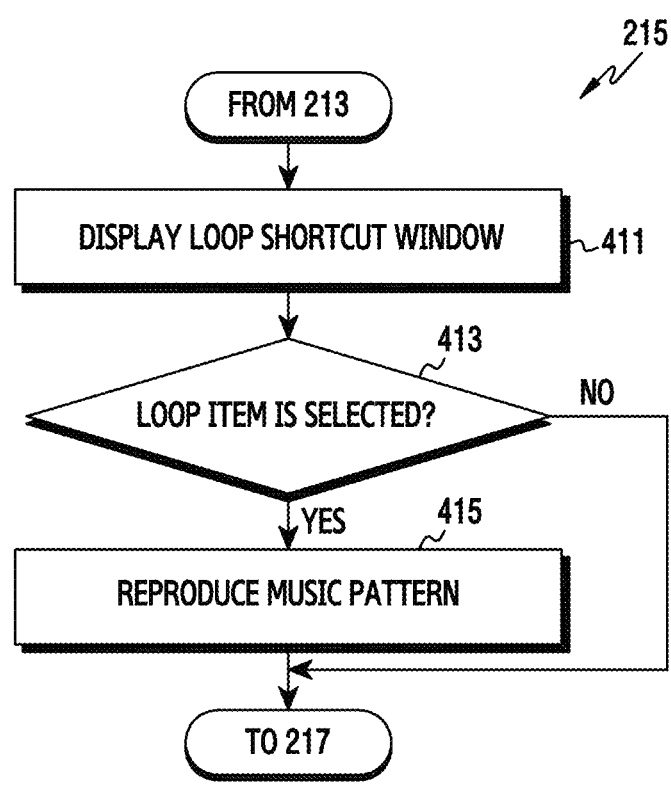
FIG. 4 is a flowchart of an example of a process associated with the process of FIG. 2, according to various embodiments of the present disclosure.

FIG. 4 is a flowchart of an example of a process for performing operation 215, according to various embodiments of the present disclosure. According to the process, the controller 160 may display loop shortcut windows 1100 (1110 and 1120) in operation 411. That is, the controller 160 may display the loop shortcut window 1100 on the looper screen 700. Here, the controller 160 may display the loop shortcut window 1100 on the loop region 740.

At this time, the controller 160 may display the loop shortcut screen 1100 on the looper screen 700 as shown in FIG. 11. The loop shortcut window 1100 may include a first loop shortcut window 1101 and a second loop shortcut window 1102. Here, the first-loop shortcut window 1101 and a second loop shortcut window 1102 may be superimposed on the loop items 741. The first loop shortcut window 1101 may be disposed on one side of the loop region 740. Here, the first loop shortcut window 1101 may be displayed on one side of the loop region 740. In addition, the first loop shortcut window 1101 may include at least one loop shortcut item 1110. The second loop shortcut window 1102 may be disposed on the other side of the loop region 740. Here, the second loop shortcut window 1102 may be displayed on the other side of the loop region 740. In addition, the second loop shortcut window 1102 may include at least one effect shortcut item 1120.

Next, when at least one of the loop items 741 is selected from the looper screen 700, the controller 160 may detect the selection of the loop item in operation 413. For example, when the touch gesture occurs in the loop region 740, the controller 160 may select at least one of the loop items 741 according to the touch gesture. For example, when at least one touch occurs in the loop region 740, the controller 160 may select at least one of the loop items 741 according to the position of the at least one touch. On the other hand, when the movement of the touch occurs in the loop region 740, the controller 160 may select at least one of the loop items 741 according to the movement path of the touch. On the other hand, when the combination icon 751 is selected from the item region 750, the controller 160 may arbitrarily select at least one of the loop items 741. For example, the controller 160 may select at least one item from each of the columns of the loop items 741.

Next, the controller 160 may reproduce at least one of the music patterns in operation 415. That is, the controller 160 may reproduce at least one of the music patterns that correspond to at least one of the loop items 741 that are selected in operation 413. For example, the controller 160 may reproduce the music pattern(s) only once. As another example, the controller 160 may repeatedly reproduce the music pattern(s). As yet another example, the controller 160 may continuously reproduce at least one of the music patterns while the selection of the loop items 741 is maintained. In some implementations, the controller 160 may display at least one reproduction beat of the music patterns through the beat indicator 752. For example, the controller 160 may flicker the beat indicator 752 to correspond to the at least one reproduction beat of the music patterns. Thereafter, the process may proceed to operation 217.

Figure 12:
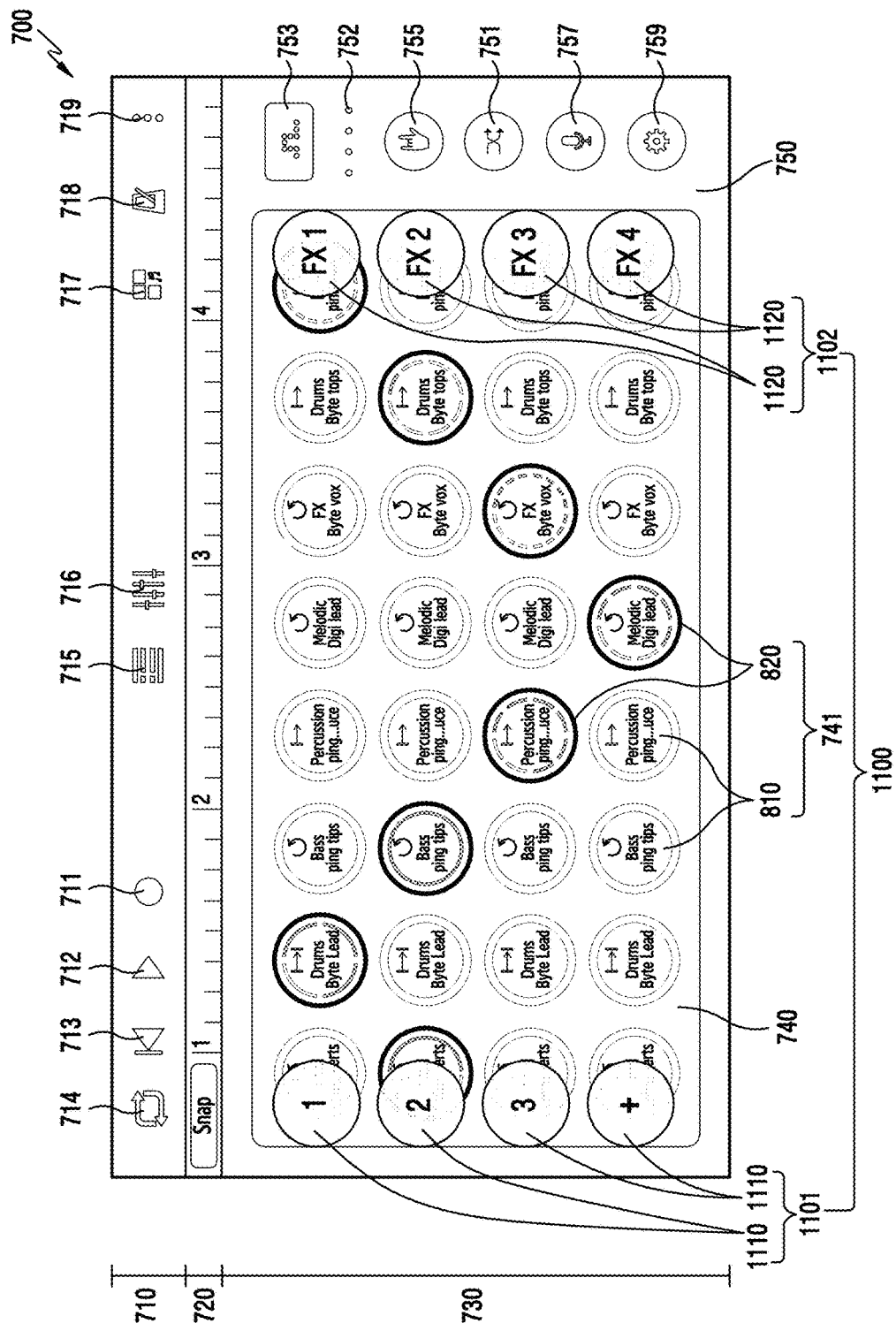
FIG. 12 is a diagram of an example of a user interface, according to various embodiments of the present disclosure.

At this time, when reproducing at least one of the music patterns, the controller 160 may activate at least one of the loop items 741 that corresponds to one or more of the music patterns that are being reproduced, as shown in FIG. 12. For example, at least one of the loop items 741 may be converted from an inactive item 810 into an active item 820. Then, the controller 160 may display the active items 820 differently from the inactive items 810 (e.g., in a different color). For example, the controller 160 may highlight at least one of the active items 820 and/or display a marker on (or around) the active items 820 (e.g., dashed circle). In some implementations, the controller 160 may select the color(s) in which the active items are highlighted based on the respective positions of the active items 820 in the loop region 740. To this end, various colors may be individually assigned to the columns of the loop items 741 in the loop region 740.

On the other hand, in operation 413, when the loop items 741 of the looper screen 700 are not selected, the process may proceed to operation 217.

In operation 217, the controller 160 may detect whether a storage event is generated. For example, the storage event may be generated when one or more of the shortcut items 1110 and 1120 is selected from the looper screen 700. For instance, when a touch gesture has occurred in correspondence to the shortcut items 1110 and 1120, the controller 160 may detect the storage event from the touch gesture. For example, when a touch occurs on the shortcut items 1110, 1120, the controller 160 may determine whether a touch retention time, that is, the touch time is equal to a predetermined threshold time or longer. In addition, when the touch time is longer than the threshold time, the controller 160 may detect the storage event.

Next, the controller 160 may store at least one of the loop items 741 or any one of the audio effects in the shortcut items 1110 and 1120, in operation 219. At this time, the controller 160 may map at least one of the loop items 741 to the shortcut items 1110 and 1120 and store an indication of the mapping. On the other hand, the controller 160 may map any one of the audio effects to the shortcut items 1110 and 1120 and store them. According to aspects of the disclosure, the shortcut storage operation of at least one of the loop items 741 or any one of the audio effects by the controller 160 will be described later in more detail with reference to FIG. 5.

Figure 5:
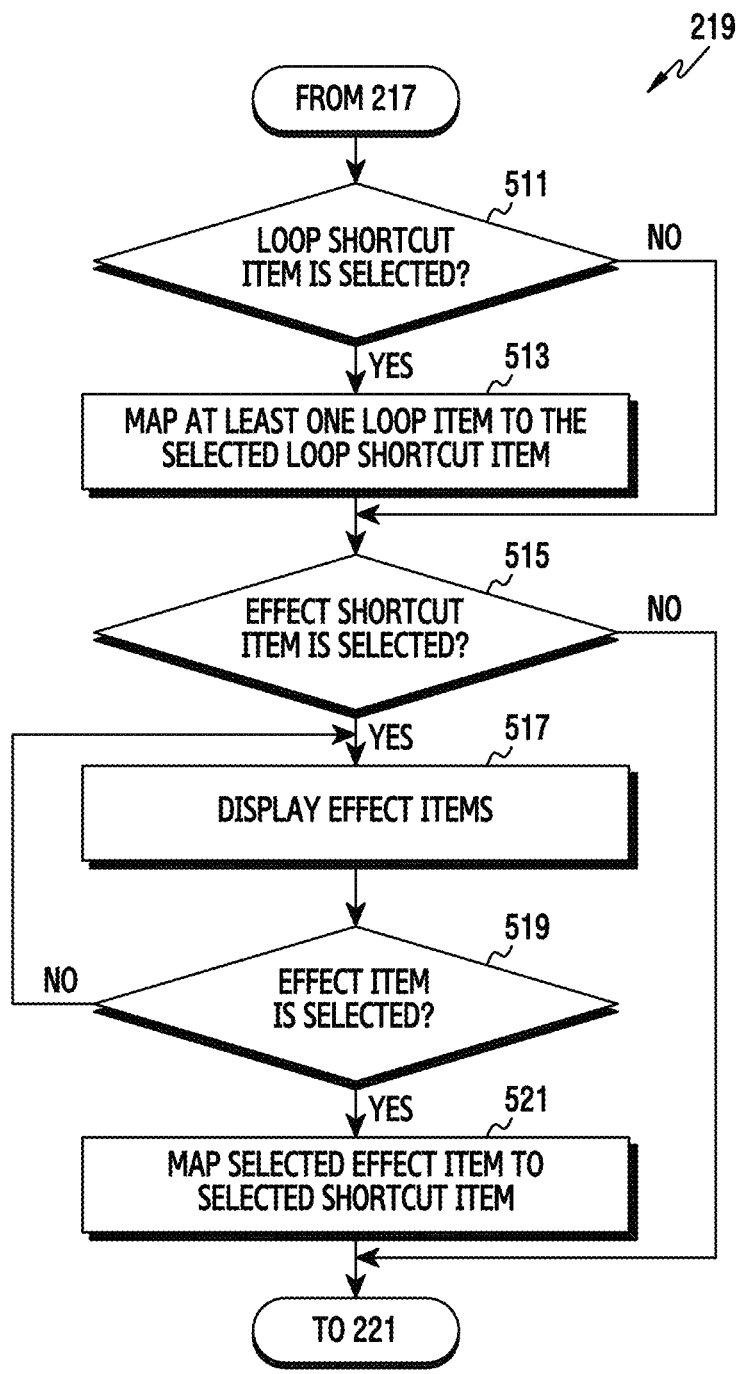
FIG. 5 is a flowchart of an example of a process associated with the process of FIG. 2, according to various embodiments of the present disclosure.

FIG. 5 is a flowchart of an example of a process for performing operation 219, according to various embodiments of the present disclosure. According to the process, when the loop shortcut item 1110 is selected, the controller 160 may detect the selection in operation 511. That is, the controller 160 may detect a storage event that is generated in response to the loop shortcut item 1110 being selected.

In operation 513, the controller 160 may map at least one of the loop items 741 to the loop shortcut item 1110 and store an indication of the mapping. At this time, the controller 160 may map at least one active item 820 to the loop shortcut item 1110 and store an indication of the mapping. Here, when a plurality of active items 820 are available in the loop region 740, the controller 160 may map a combination of the active items 820 to the loop shortcut item 1110 and store an indication of the mapping.

On the other hand, when the loop shortcut item 1110 is not selected in operation 511, the process may proceed to operation 515.

Then, when the effect shortcut item 1120 is selected, the controller 160 may detect the selection in operation 515. That is, the controller 160 may detect a storage event that is generated in response to the loop shortcut item 1120 being selected.

Next, the controller 160 may display a plurality of effect items 1310 in operation 517. For example, the controller 160 may display the effect items 1310 on the looper screen 700. In some implementations, the controller 160 may display the effect items 1310 in the loop region 740.

Figure 13:
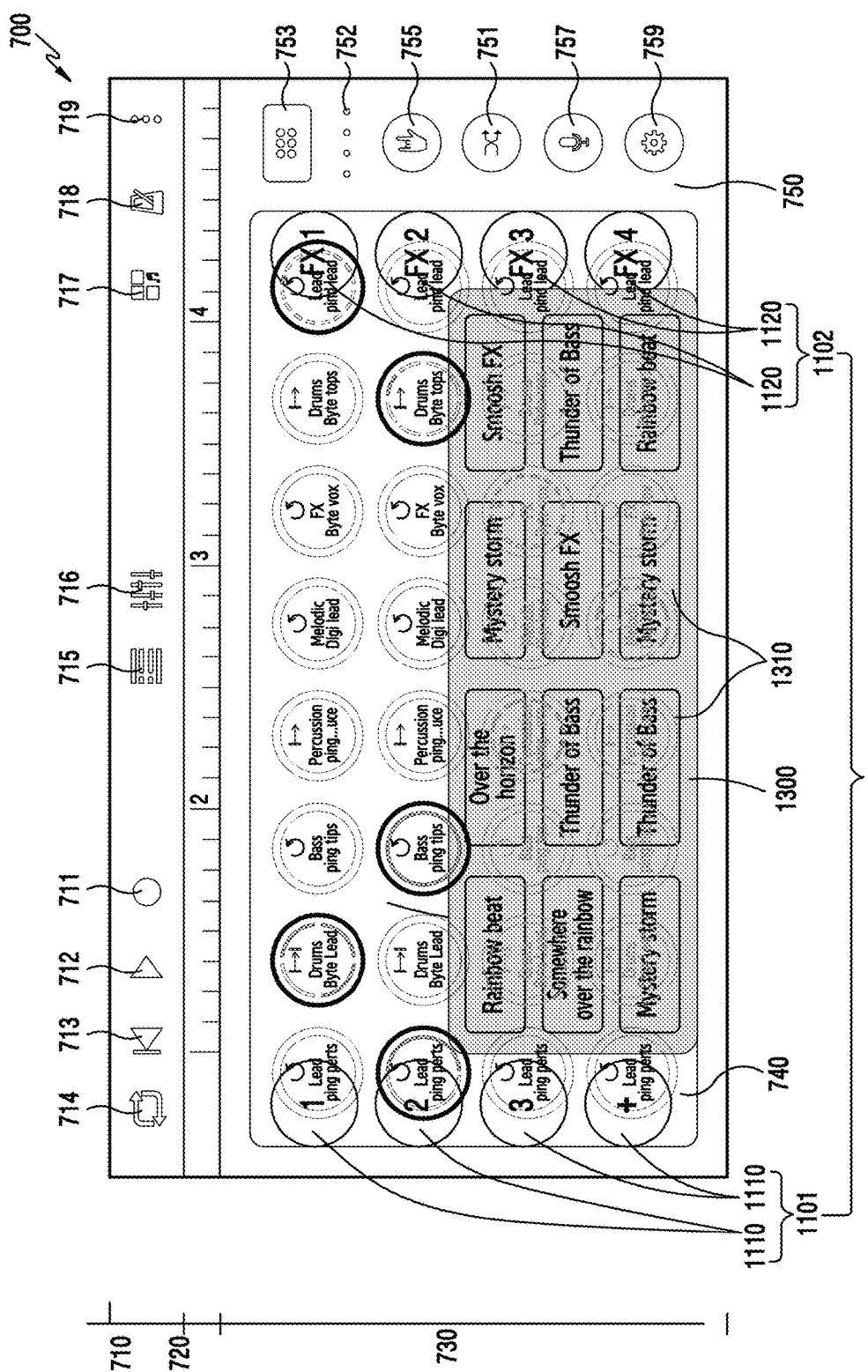
FIG. 13 is a diagram of an example of a user interface, according to various embodiments of the present disclosure.

At this time, the controller 160 may display an effect selection window 1300 on the looper screen 700 as shown in FIG. 13. Here, the controller 160 may display the effect selection window 1300 on the loop region 740 in the looper screen 700. The effect selection window 1300 may include the plurality of effect items 1310. Here, the audio effects may be individually assigned to the effect items 1310. That is, the audio effects may be preconfigured to the effect items 1310. Here, each of the audio effects may be determined by a combination of the setting values corresponding to a plurality of audio parameters. That is, according to the change of the setting values corresponding to at least one of the audio parameters, the audio effects may be different from each other.

Then, when any one of the effect items 1310 is selected, the controller 160 may detect the selection in operation 519. Afterwards, in operation 521, the controller 160 may map any one of the effect items 1310 to an effect shortcut item 1120 and store an indication of the mapping. Accordingly, the controller 160 may map any one of the audio effects to the effect shortcut item 1120 and store an indication of the mapping. Thereafter, the process may proceed to operation 221.

On the other hand, when the effect shortcut item 1120 is not selected in operation 515, the process may proceed to operation 221.

On the other hand, when the storage event is not detected in operation 217, the process may proceed to operation 221.

In operation 221, the controller 160 may detect whether an execution event is generated. For example, the execution event may be generated, when any of the shortcut items 1110 and 1120 is selected from the looper screen 700. For instance, when a touch gesture is performed on at least one of the shortcut items 1110 and 1120, the controller 160 may detect an execution event that is generated in response to the touch gesture. For example, when a touch occurs on the shortcut items 1110 and 1120, the controller 160 may determine whether a touch retention time (e.g. the time for which the touch is maintained). More particularly, the controller 160 may detect whether the duration of the touch is equal or greater than a threshold time period. When the touch time is shorter than the threshold time period, the controller 160 may detect the execution event.

Next, the controller 160 may execute at least one of the loop items 741 or any one of the audio effects by the shortcut items in operation 223. That is, the controller 160 may execute at least one of the loop items 741 or any one of the audio effects that corresponds to the shortcut items 1110 and 1120. At this time, the controller 160 may execute at least one of the loop items 741 corresponding to the shortcut items 1110 and 1120. On the other hand, the controller 160 may execute any one of the audio effects corresponding to the shortcut items 1110 and 1120. Operation 223 will be described in further detail in the discussion with respect to FIG. 6.

Figure 6:
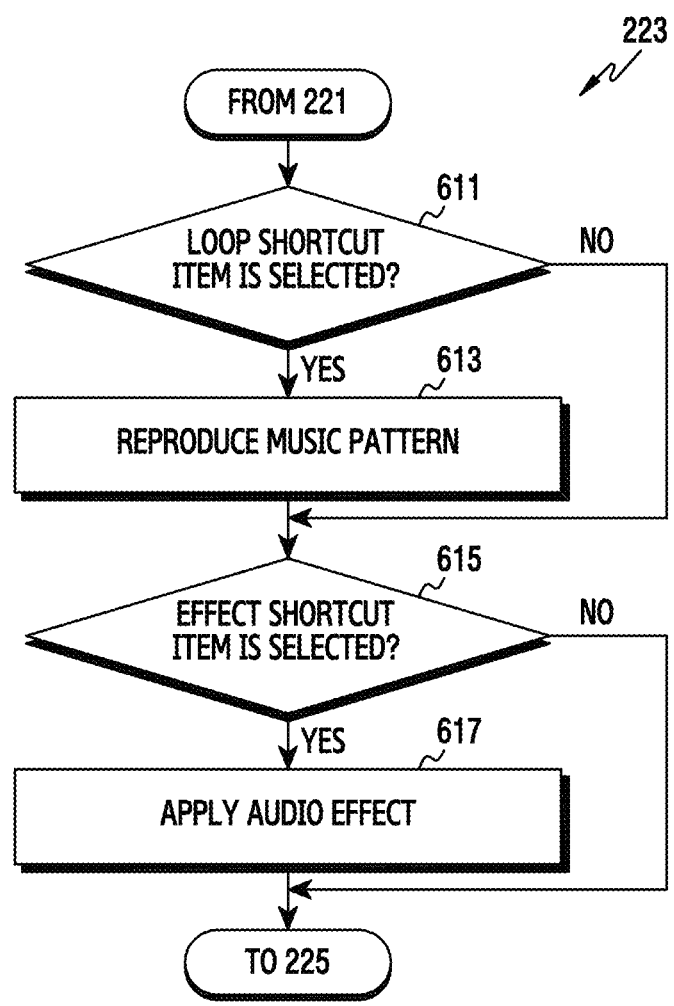
FIG. 6 is a flowchart of an example of a process associated with the process of FIG. 2, according to various embodiments of the present disclosure.

FIG. 6 is a flowchart of an example of a process for performing operation 223, according to various embodiments of the present disclosure.

Referring to FIG. 6, when the loop shortcut item 1110 is selected, the controller 160 may detect the selection in operation 611. That is, the controller 160 may detect an execution event that corresponds to the loop shortcut item 1110.

Next, the controller 160 may reproduce at least any one of the music patterns in operation 613. For example, the controller 160 may detect at least one of the loop items 741 that corresponds to the loop shortcut item 1110. That is, the controller 160 may reproduce at least one of the music patterns that corresponds to at least one of the loop items 741. For example, the controller 160 may reproduce the music pattern(s) only once. As another example, the controller 160 may repeatedly reproduce the music pattern(s). As yet another example, the controller 160 may continuously reproduce the music pattern(s). In some implementations, the controller 160 may display at least one reproduction beat of the music patterns through the beat indicator 752. For example, the controller 160 may flicker the beat indicator 752 to correspond to the at least one reproduction beat of the music patterns. Thereafter, the process may proceed to operation 615.

At this time, when reproducing at least one of the music patterns, the controller 160 may activate at least one of the loop items 741 that corresponds to one or more of the music patterns that are being reproduced, as shown in FIG. 12. Here, at least one of the loop items 741 may be converted from an inactive item 810 into an active item 820. Then, the controller 160 may display the active items 820 differently from the inactive items 810 (e.g., in a different color). For example, the controller 160 may highlight at least one of the active items 820 or display marker on or around the active items 820 (e.g., dashed circle). In addition, the controller 160 may select the color(s) in which the active items are highlighted based on the respective positions of the active items 820 in the loop region 740. To this end, various colored lights may be individually assigned to the columns of the loop items 741 in the loop region 740.

On the other hand, when the loop shortcut item 1110 is not selected in operation 611, the process may proceed to operation 615.

Then, when the effect shortcut item 1120 is selected, the controller 160 may detect the selection in operation 615. That is, the controller 160 may detect an execution event that corresponds to the effect shortcut item 1120.

Then, the controller 160 may apply any one of the audio effects in operation 617. At this time, the controller 160 may detect any one of the audio effects that corresponds to the effect shortcut item 1120. That is, the controller 160 may apply any one of the audio effects to at least one of the music patterns. In addition, the controller 160 may continuously reproduce at least one of the music patterns. Thereafter, the process may proceed to operation 225.

On the other hand, when the effect shortcut item 1120 is not selected in operation 615, the process may proceed to operation 225.

On the other hand, when the execution event is not detected in operation 221, the process may proceed to operation 225.

In operation 225, the controller 160 may detect whether a termination event is generated. If the termination event is generated, the controller 160 may end the execution of the process.

On the other hand, when the termination event is not detected in operation 225, the controller 160 may return to operation 215. In addition, the controller 160 may repeatedly perform at least one of operation 215 to operation 225.

According to the present disclosure, the electronic device 100 may reproduce music through the looper functions. That is, the electronic device 100 may display the loop items 741 and reproduce music patterns of the loop items 741 that correspond to input data.

At this time, the electronic device 100 may map at least one of the loop items 741 to the shortcut items 1110 and 1120 and store an indication of the mapping. That is, while executing the looper function, the electronic device 100 may call the shortcut items 1110 and 1120 and store the combination of music patterns and the combination of audio effects. Accordingly, the electronic device 100 may store the combination of music patterns and the combination of audio effects to be remembered by the user of the electronic device 100.

In addition, the electronic device 100 may execute at least one of the loop items 741 by using the shortcut items 1110 and 1120. That is, while executing the looper function, the electronic device 100 may call the shortcut items 1110 and 1120, and execute the combination of music patterns and/or apply the combination of audio effects. Accordingly, the electronic device may flexibly perform a complex musical performance.

Therefore, the use efficiency and a user convenience of the electronic device 100 can be improved.

The above-described aspects of the present disclosure can be implemented in hardware, firmware or via the execution of software or computer code that can be stored in a recording medium such as a CD-ROM, a Digital Versatile Disc (DVD), a magnetic tape, a RAM, a floppy disk, a hard disk, or a magneto-optical disk or computer code downloaded over a network originally stored on a remote recording medium or a non-transitory machine-readable medium and to be stored on a local recording medium, so that the methods described herein can be rendered via such software that is stored on the recording medium using a general purpose computer, or a special processor or in programmable or dedicated hardware, such as an ASIC or FPGA. As would be understood in the art, the computer, the processor, microprocessor controller or the programmable hardware include memory components, e.g., RAM, ROM, Flash, etc. that may store or receive software or computer code that when accessed and executed by the computer, processor or hardware implement the processing methods described herein. In addition, it would be recognized that when a general purpose computer accesses code for implementing the processing shown herein, the execution of the code transforms the general purpose computer into a special purpose computer for executing the processing shown herein. Any of the functions and steps provided in the Figures may be implemented in hardware, software or a combination of both and may be performed in whole or in part within the programmed instructions of a computer. No claim element herein is to be construed under the provisions of 35 U.S.C. 112, sixth paragraph, unless the element is expressly recited using the phrase "means for". The terms "unit" or "module" referred to herein is to be understood as comprising hardware such as a processor or microprocessor configured for a certain desired functionality, or a non-transitory medium comprising machine executable code, in accordance with statutory subject matter under 35 U.S.C. § 101 and does not constitute software per se.

Moreover, the embodiments disclosed in this specification are suggested for the description and understanding of technical content but do not limit the range of the present disclosure. Accordingly, the range of the present disclosure should be interpreted as including all modifications or various other embodiments based on the technical idea of the present disclosure.

What is claimed is:
1. A method for use in an electronic device, comprising:
displaying a looper screen including a plurality of loop items and a shortcut icon;
displaying loop shortcut items on a side of the looper screen, in response to selecting the shortcut icon;
reproducing music patterns corresponding to at least two loop items and displaying visual effect representing activation of the at least two loop items, in response to selecting the at least two loop items among the plurality of loop items;
mapping the at least two loop items to a loop shortcut item among the loop shortcut items, in response to selecting the loop shortcut item by using a first touch gesture; and reproducing the music patterns mapped to the at least two loop items, in response to selecting the loop shortcut item by using a second touch gesture after mapping the at least two loop items to the loop shortcut item, wherein the plurality of loop items comprise a first column of loop items associated with a first instrument and a second column of loop items associated with a second instrument, wherein the plurality of loop items is arranged in columns including the first column and the second column, and wherein a single loop item is selected from each of the columns including the at least two loop items mapped to the loop shortcut item.

2. The method of claim 1, wherein the visual effect comprises colored light.

3. The method of claim 1, further comprising:
displaying effect shortcut items on another side of the looper screen; and
applying an audio effect to the music patterns, in response to selecting an effect shortcut item among the effect shortcut items by using a third touch gesture.

4. The method of claim 3, further comprising:
displaying a plurality of effect items, in response to selecting the effect shortcut item among the effect shortcut items by using a fourth touch gesture; and
mapping the effect shortcut item to at least one audio effect of at least one effect item, in response to selecting the at least one effect item among the plurality of effect items,
wherein each of the plurality of effect items corresponds to a different one of a plurality of audio effects.

5. The method of claim 3, wherein the loop shortcut items and the effect shortcut items are displayed concurrently, in response to selecting the shortcut icon.

6. The method of claim 1, wherein the looper screen further comprises:
a loop region in which the plurality of loop items are arranged in a grid; and
an icon region comprising the shortcut icon used for shortcut setting or shortcut executing.

7. The method of claim 1, wherein the loop shortcut items are displayed by overlapping at least part of the plurality of loop items.

8. The method of claim 1, wherein the first touch gesture comprises touching the loop shortcut item during a period longer than a threshold, and
wherein the second touch gesture comprises touching the loop shortcut item during a period less than the threshold.

9. An electronic device comprising:
a display unit;
an audio processor;
a memory;
at least one processor operatively coupled to the display unit, the audio processor and the memory, configured to:
display, by using the display unit, a looper screen including a plurality of loop items and a shortcut icon;
display, on the looper screen, loop shortcut items on a side of the looper screen, in response to selecting the shortcut icon;
reproduce music patterns corresponding to at least two loop items and display visual effect representing activation of the at least two loop items, in response to selecting the at least two loop items among the plurality of loop items;
map the at least two loop items to a loop shortcut item among the loop shortcut items, in response to selecting the loop shortcut item by using a first touch gesture; and
reproduce the music patterns mapped to the at least two loop items, in response to selecting the loop shortcut item by using a second touch gesture after mapping the at least two loop items to the loop shortcut item,
wherein the plurality of loop items comprise a first column of loop items associated with a first instrument and a second column of loop items associated with a second instrument,
wherein the plurality of loop items is arranged in columns including the first column and the second column, and
wherein a single loop item is selected from each of the columns including the at least two loop items mapped to the loop shortcut item.

10. The electronic device of claim 9, wherein the visual effect comprises colored light.

11. The electronic device of claim 9, wherein the at least one processor is further configured to:
display effect shortcut items on another side of the looper screen; and
apply an audio effect to the music patterns, in response to selecting an effect shortcut item among the effect shortcut items by using a third touch gesture.

12. The electronic device of claim 11, wherein the at least one processor is further configured to:
display a plurality of effect items, in response to selecting the effect shortcut item among the effect shortcut items by using a fourth touch gesture; and
map the effect shortcut item to at least one audio effect of at least one effect item, in response to selecting the at least one effect item among the plurality of effect items,
wherein each of the plurality of effect items corresponds to a different one of a plurality of audio effects.

13. The electronic device of claim 11, wherein the loop shortcut items and the effect shortcut items are displayed concurrently.

14. The electronic device of claim 9, wherein the looper screen further comprises:
a loop region in which the plurality of loop items are arranged in a grid; and
an icon region comprising the shortcut icon used for shortcut setting or shortcut executing.

15. The electronic device of claim 9, wherein the loop shortcut items are displayed by overlapping at least part of the plurality of loop items.

16. The electronic device of claim 10, wherein the first touch gesture comprises touching the loop shortcut item during a period longer than a threshold, and
wherein the second touch gesture comprises touching the loop shortcut item during a period less than the threshold.

* * * * *